(12) United States Patent
Kramer et al.

(10) Patent No.: US 10,471,993 B2
(45) Date of Patent: Nov. 12, 2019

(54) TWO-TRACK VEHICLE

(71) Applicant: AUDI AG, Ingolstadt (DE)

(72) Inventors: Tobias Kramer, Stammham (DE); Oliver Thaysen, Ingolstadt (DE); Tobias Neess, Ingolstadt (DE)

(73) Assignee: AUDI AG, Ingolstadt (DE)

(*) Notice: Subject to any disclaimer, the term of this patent is extended or adjusted under 35 U.S.C. 154(b) by 102 days.

(21) Appl. No.: 15/564,151

(22) PCT Filed: Mar. 17, 2016

(86) PCT No.: PCT/EP2016/000481
§ 371 (c)(1),
(2) Date: Oct. 3, 2017

(87) PCT Pub. No.: WO2016/162108
PCT Pub. Date: Oct. 13, 2016

(65) Prior Publication Data
US 2018/0079452 A1    Mar. 22, 2018

(30) Foreign Application Priority Data

Apr. 4, 2015   (DE) .................. 10 2015 004 465

(51) Int. Cl.
*B62D 21/11*   (2006.01)
*B62D 21/15*   (2006.01)

(52) U.S. Cl.
CPC .............. *B62D 21/11* (2013.01); *B62D 21/15* (2013.01)

(58) Field of Classification Search
CPC ........ B62D 21/06; B62D 21/11; B62D 21/15; B62D 21/152; B62D 21/155
See application file for complete search history.

(56) References Cited

U.S. PATENT DOCUMENTS 5,562,308 A * 10/1996 Kamei ............... B60G 3/20
180/377
5,641,180 A *  6/1997 Kamei ............... B60K 5/1216
180/291

(Continued)

FOREIGN PATENT DOCUMENTS

CA      2420557 A1    4/2002
CN    101778754 A     7/2010

(Continued)

OTHER PUBLICATIONS

Notification of Transmittal of Translation of the International Preliminary Report on Patentability dated Oct. 19, 2017, in connection with corresponding international application No. PCT/EP2016/000481 (9 pages).

(Continued)

*Primary Examiner* — Laura Freedman
(74) *Attorney, Agent, or Firm* — Maier & Maier, PLLC

(57) ABSTRACT

A two-track vehicle with a vehicle body suspension, in particular with a front auxiliary frame, which is connected at the lateral vehicle body longitudinal carriers, and with a drive assembly-bearing component, in particular with a tunnel transverse bearing carrier, which is arranged at a longitudinal offset at a distance from the auxiliary frame and which bridges over a vehicle body central tunnel. A drive assembly is supported by the auxiliary frame and also on the tunnel transverse carrier. An intermediate coupling element is provided, which connects the auxiliary frame to the tunnel transverse carrier in a force-transmitting manner, while the longitudinal offset is bridged over.

10 Claims, 4 Drawing Sheets

(56) References Cited

U.S. PATENT DOCUMENTS

| | | | | |
|---|---|---|---|---|
| 6,708,793 | B2* | 3/2004 | Witherspoon | B60K 5/1216 |
| | | | | 180/291 |
| 6,997,276 | B2* | 2/2006 | Yoshida | B60G 99/00 |
| | | | | 180/232 |
| 7,393,016 | B2* | 7/2008 | Mitsui | B62D 25/08 |
| | | | | 180/232 |
| 7,475,754 | B2* | 1/2009 | Misaki | B62D 21/11 |
| | | | | 180/291 |
| 7,584,815 | B2* | 9/2009 | Ogawa | B60G 3/20 |
| | | | | 180/312 |
| 8,490,988 | B2* | 7/2013 | Takeshita | B62D 21/155 |
| | | | | 280/124.109 |
| 8,613,461 | B2* | 12/2013 | Young | B62D 21/155 |
| | | | | 280/124.109 |
| 8,672,393 | B2* | 3/2014 | Tomozawa | B62D 25/082 |
| | | | | 296/187.09 |
| 9,174,681 | B2* | 11/2015 | Shigihara | B62D 25/08 |
| 9,216,768 | B1* | 12/2015 | Dressel | B62D 21/155 |
| 9,434,416 | B2* | 9/2016 | Isakiewitsch | B62D 21/11 |
| 9,776,662 | B2* | 10/2017 | Hirano | B60K 5/12 |
| 10,118,476 | B2* | 11/2018 | Bujak | B60K 5/1208 |
| 10,118,643 | B2* | 11/2018 | Komiya | B62D 21/06 |
| 2014/0110925 | A1 | 4/2014 | Goellner et al. | |
| 2014/0312654 | A1 | 10/2014 | Komiya et al. | |
| 2018/0105027 | A1* | 4/2018 | Langhoff | B60K 1/02 |

FOREIGN PATENT DOCUMENTS

| | | | | |
|---|---|---|---|---|
| CN | 102039933 A | | 5/2011 | |
| DE | 102006013550 A1 | | 9/2007 | |
| DE | 102008063448 A1 | | 7/2010 | |
| DE | 112008003307 T5 | | 1/2011 | |
| DE | 112011102185 T5 | | 4/2013 | |
| DE | 112012005306 T5 | | 10/2014 | |
| DE | 112013001681 T5 | | 1/2015 | |
| EP | 1683709 A1 | * | 7/2006 | ........... B62D 21/155 |
| EP | 2048063 A1 | | 4/2009 | |
| EP | 2457807 A2 | | 5/2012 | |
| EP | 2767457 A1 | | 8/2014 | |
| GB | 2457591 A | * | 8/2009 | ........... B62D 21/155 |
| JP | 2004-074836 A | | 3/2004 | |
| JP | 2006-205811 A | | 8/2006 | |
| KR | 100737601 B1 | | 7/2007 | |

OTHER PUBLICATIONS

International Search Report dated Jun. 14, 2016 of corresponding international application no. PCT/EP2016/000481 (13 pages).
German Search Report dated Oct. 14, 2015 of corresponding German application No. 10 2015 004 465.6 (5 pages).
Office Action dated Dec. 3, 2018 in corresponding Chinese Application No. 201880020234.X; 12 pages; Machine translation attached.
Office Action dated Jul. 11, 2019, in corresponding Chinese Application No. 201680020234.X including partial machine-generated English language translation; 11 pages.

* cited by examiner

TWO-TRACK VEHICLE

FIELD

The invention relates to a two-track vehicle.

BACKGROUND

The body structure of a motor vehicle should be designed in such a way that dynamic rigidity requirements (for example requirements on torsional rigidity when driving through a curve about a central longitudinal axis of a vehicle) are fulfilled. In addition, the vehicle body structure should also be designed in such a way that in the case of a crash, the impact forces can be directed into the body structure of the vehicle for the most part without deformation.

DE 10 2006 013 550 A1 discloses a vehicle of the generic type which is provided with an auxiliary front frame used as a chassis suspension which is connected to the lateral longitudinal braces of the vehicle body. The vehicle is in addition also provided with a tunnel transverse carrier that serves as a drive assembly-bearing component. This component is arranged at an offset form the auxiliary frame in the longitudinal direction of the vehicle and it bridges over a central tunnel on the side of the vehicle body in the transverse direction of the vehicle. The auxiliary frame and the tunnel cross-member form together a supporting base on which a drive assembly of the motor vehicle can be supported via the bearing points, for example with a three-point bearing construction.

In a front carriage described in DE 10 2006 013 550 A, the vehicle body suspension (that is to say the auxiliary frame) and the assembly-bearing component (that is to say the tunnel transverse member) are arranged at a distance from each other, in particular so that they are connected to each other without transmitting force. This generally results in a split arrangement of the auxiliary frame and of the other supporting structures reinforcing the vehicle body. This split arrangement thus can fulfill the requirements on the rigidity of the vehicle body only to a reduced extent.

From DE 11 2008 307 T5 is known another motor vehicle in which the tunnel transverse member is connected via a strut arrangement in a power-transmitting manner to the front vehicle body longitudinal carriers. In the event of a crash, an additional load path is formed, which bifurcates at the connection point between the longitudinal carriers of the vehicle body and the strut arrangement and then continues via the tunnel transverse carrier to the longitudinal carriers.

The object of the invention is therefore to provide a motor vehicle wherein the rigidity requirements mentioned above can be fulfilled in a simple manner.

SUMMARY

The invention is based on the fact that according to prior art, the vehicle body suspensions (which is to say for example the auxiliary frame) and the assembly bearing components are decoupled from each other so that no forces can be transmitted, which is disadvantageous in view of a rigidity increase. Against this background, an intermediate coupling element is provided according to the characterizing part of claim 1, which is arranged so that it bridges over a longitudinal offset between the auxiliary frame and the tunnel transverse carrier enabling force transmission. In this manner, an additional load path is provided in dynamic driving situations or in the event of a crash, which transmits the forces from the vehicle body suspension (which is to say from the auxiliary frame) to the assembly bearing component.

The core of the invention is therefore generally based on the fact that the front suspension structures are connected in a force-transmitting manner to the supporting bottom group sections of the vehicle body. In this manner, the rigidity of the vehicle body with respect to the transverse rigidity and vertical rigidity (which is to say torsional rigidity and/or bending rigidity) are improved, both statically and dynamically.

In a concrete technical implementation, the vehicle body suspension can be an auxiliary front frame which is laterally linked with a steering link to a vehicle carrier carrying a vehicle wheel. The assembly bearing component can be preferably a tunnel transverse carrier, which bridges over a central tunnel that is formed in a floor group on the side of the vehicle body. The following aspects of the invention will be explained in order to enable easy understanding of the invention with respect to the concrete technical implementation mentioned above; however, without creating a specific limitation thereto.

So for example, the intermediate coupling element can be preferably formed as a special reinforcing structure with a correspondingly reduced weight of the components. The intermediate coupling element can be also designed in a first embodiment variant as a material unit and/or as a unit that is integrated on the auxiliary frame or on the cross-member of the tunnel. However, it is preferred when a modular construction is created, wherein the intermediate coupling element is a structural component that is separated from the auxiliary frame and from the cross-member of the tunnel. This is because different material combinations are conceivable with such a construction, so that for example all the three components (which is to say the auxiliary frame, the intermediate coupling element and also the tunnel transverse member) are constructed from different materials.

The tunnel transverse member can be for example manufactured from a short fiber-reinforced polymer material, while the auxiliary frame can be made from GFRP material (glass fiber-reinforced material).

The auxiliary frame can be according to a conventional practice constructed from two auxiliary frame carriers, which are connected to one another via transverse or diagonal struts. In addition, the auxiliary frame can be provided with front and rear attachment points for connecting the vehicle body longitudinal carriers. It is preferred when the intermediate coupling element is connected to a rear transverse strut of the auxiliary frame. The intermediate coupling element can be in this case connected in a manner that is advantageous for installation with respect to the vehicle-external auxiliary longitudinal frame carrier with a transverse offset toward the inner part of the vehicle at the auxiliary frame.

With the modular construction specified above, the tunnel transverse carrier can be provided on the side of the vehicle body with connection points for connecting to a vehicle body floor group, in which is formed a central tunnel. In addition, the tunnel transverse carrier can be provided with two connection points that are separate from it and that are used for mounting the intermediate coupling element.

In order to achieve a small required installation space, the intermediate coupling element can be provided with a flat structure. By way of an example, the intermediate coupling element can be provided with a single-shell part that is formed from sheet metal, which is to say a part formed from one piece of a sheet metal, which is positioned approximately in a horizontal plane in the assembled state.

The vehicle body-side connection points of the tunnel transverse carrier enable a direct connection to the lateral tunnel longitudinal carriers, which reinforces the central tunnel and which extends in the longitudinal direction of the vehicle in the direction toward the rear of the vehicle.

The intermediate coupling element can be positioned in a concrete realization of the invention at a height offset below the tunnel longitudinal carrier constructed in the floor group of the vehicle body. In a first variant, the intermediate coupling element can be for example elevated from the flat construction up to the level of the tunnel longitudinal carrier in order to bridge over the height offset. In such a case, the intermediate coupling element should have a Z-shape or an S-shape in order to bridge over the height offset Δz, which, however, is structurally complex and which can also have an impact on the transmission of the collision forces towards the rear in the longitudinal direction of the vehicle.

Therefore, in order to achieve a structurally simple design, the height offset can be bridged over in a second variant simply by the means of the tunnel transverse carrier. Accordingly, the connection points to the intermediate coupling element can be arranged at the tunnel transverse carrier with a height offset below the vehicle body-side connection points. A simple, flat construction of the intermediate coupling element can thus be ensured.

It is preferred when the auxiliary frame longitudinal carrier is connected in the transverse direction of the vehicle to an arrangement of struts forming a cross-shaped thrust field. In this manner, the transverse rigidity of the auxiliary frame is in particular increased. In this case, the intermediate coupling element can be connected at the rear end of the strut arrangement. In order to further increase the rigidity of the auxiliary frame, the rear cross struts can extend between the attachment points of the rear vehicle body longitudinal carrier of the auxiliary frame. The rear cross struts can be considered to be converging with its structure sections into a V-shape towards the front at a central peak point. A free space is created in this manner, in which the intermediate coupling element can be inserted with an advantageous design of the installation space.

For a stable as well as a rigid connection to the auxiliary frame, the intermediate coupling element can be provided with a crown-like outer geometry in the longitudinal direction of the vehicle, wherein the crown has for example three prongs in the front, so that each of the triangular prongs represents a front attachment point to the coupling points of the thrust field of the auxiliary frame. Among the three front connection points, one of them is a central connection point which is positioned directly at the peak position of the V-shaped rear transverse struts. The two lateral connection points can be respectively positioned at the strut sections of the rear cross strut converging into the V shape.

It is particularly preferred when both lateral connection points are positioned in the vicinity of the attachment points of the auxiliary frame at the longitudinal carriers of the vehicle body. An improved local dynamic rigidity is achieved in this manner in the area of the steering brackets, which are formed respectively in the rear at the longitudinal carrier of the auxiliary frame.

In the event of a frontal crash, a main load path is created, which introduces the impact forces via the front vehicle body carriers into the floor groups of the body of the vehicle. In addition, a secondary load path is provided which extends via the auxiliary frame as well as via the intermediate coupling element up to the tunnel transverse carrier and further into the tunnel longitudinal carrier.

The advantageous embodiments described above and/or further developments of the embodiments described in the dependant claims can be used individually or in any combinations, with the exception of cases of clear dependencies or mutually incompatible alternatives.

The invention and advantageous embodiments and further developments thereof as well as their advantages will be next explained in more detail with reference to the figures.

DETAILED DESCRIPTION OF THE DRAWINGS

Figure 1:
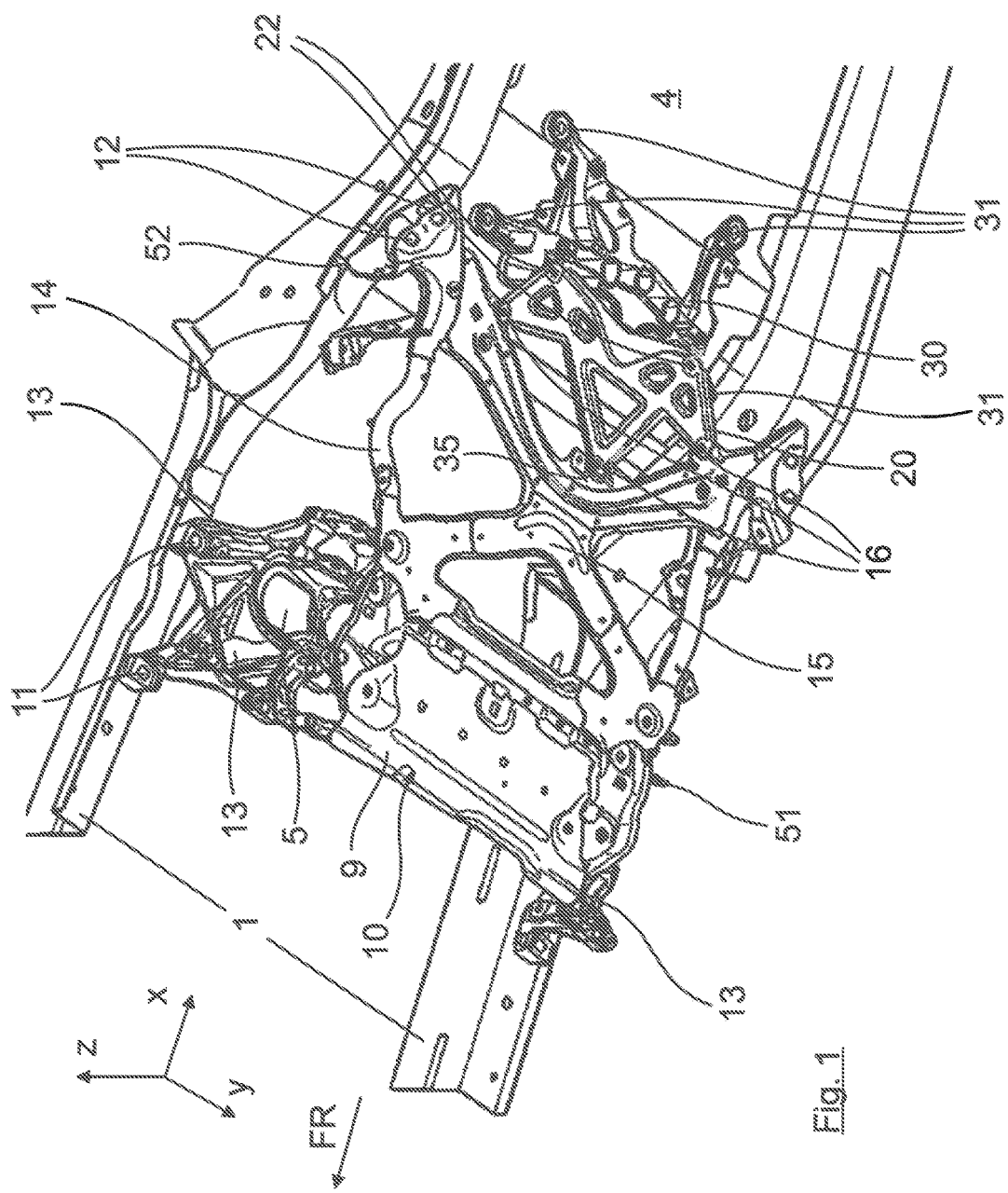
FIG. 1 a perspective view from below of the longitudinal carrier of the vehicle body with an auxiliary frame connected to it, which is connected in the longitudinal direction of the vehicle towards the rear via an intermediate coupling element in a force-transmitting manner to a tunnel transverse carrier.
Figure 2:
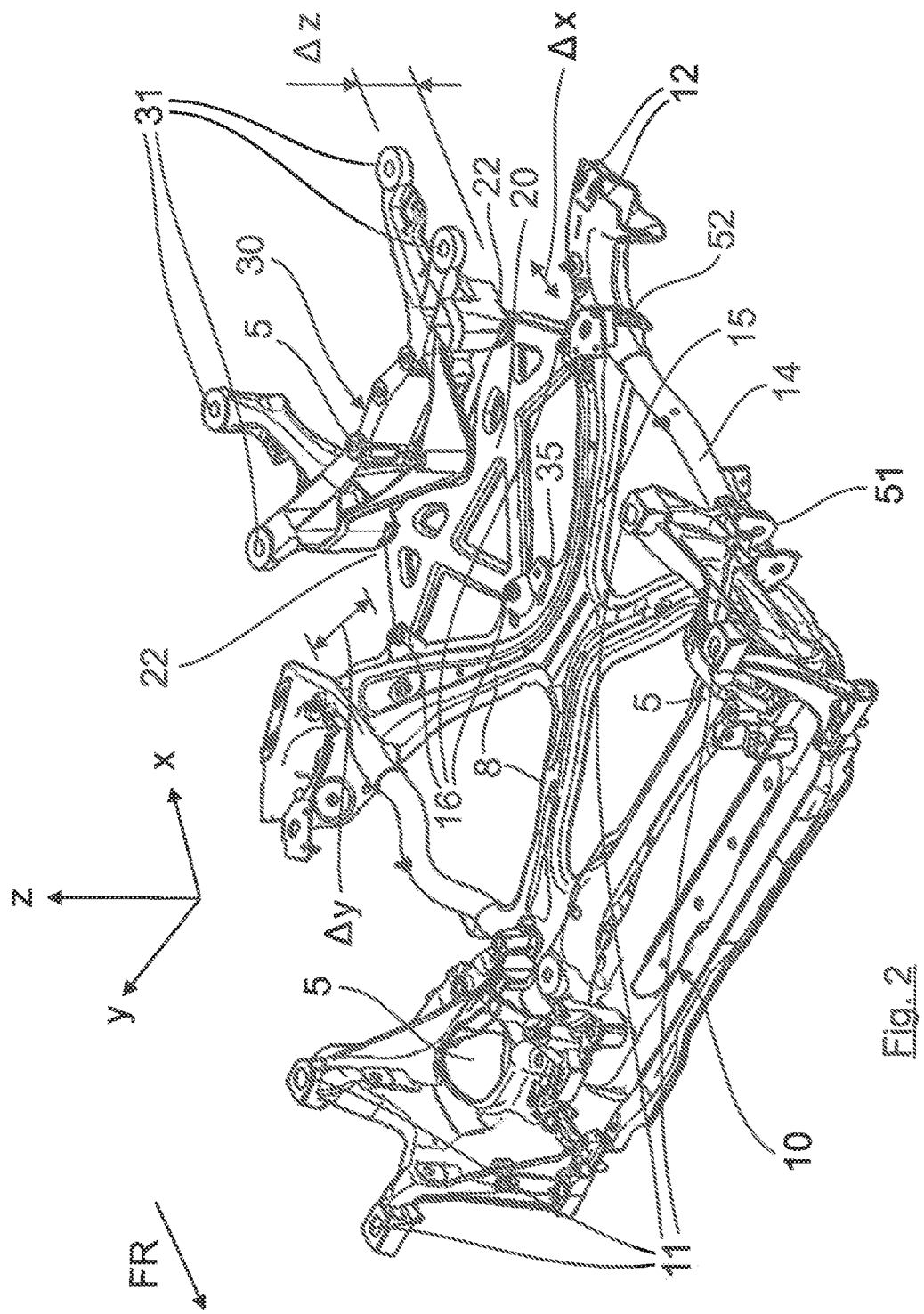
FIG. 2 the arrangement consisting of the auxiliary frame, the intermediate coupling element and the tunnel transverse carrier, shown in a perspective view from above.

FIG. 1 shows the body structure of a vehicle's front wheel to the extent that is required for an understanding of the invention. Accordingly, the vehicle body is provided with two vehicle body longitudinal carriers 1 to which an auxiliary frame (10) is connected by means of front attachment points 11 and rear attachment points 12 (via elastic bearings, not shown).

The auxiliary frame 10 is equipped with two auxiliary frame longitudinal carriers 14, which are arranged laterally opposite each other and which are connected to the front node elements 13 (for example with cast nodes), that are connected by means of the front attachment points 11 to the vehicle body longitudinal carrier 1. Both front node elements 13 are connected to one another via a front auxiliary frame transverse carrier 9.

Figure 4:
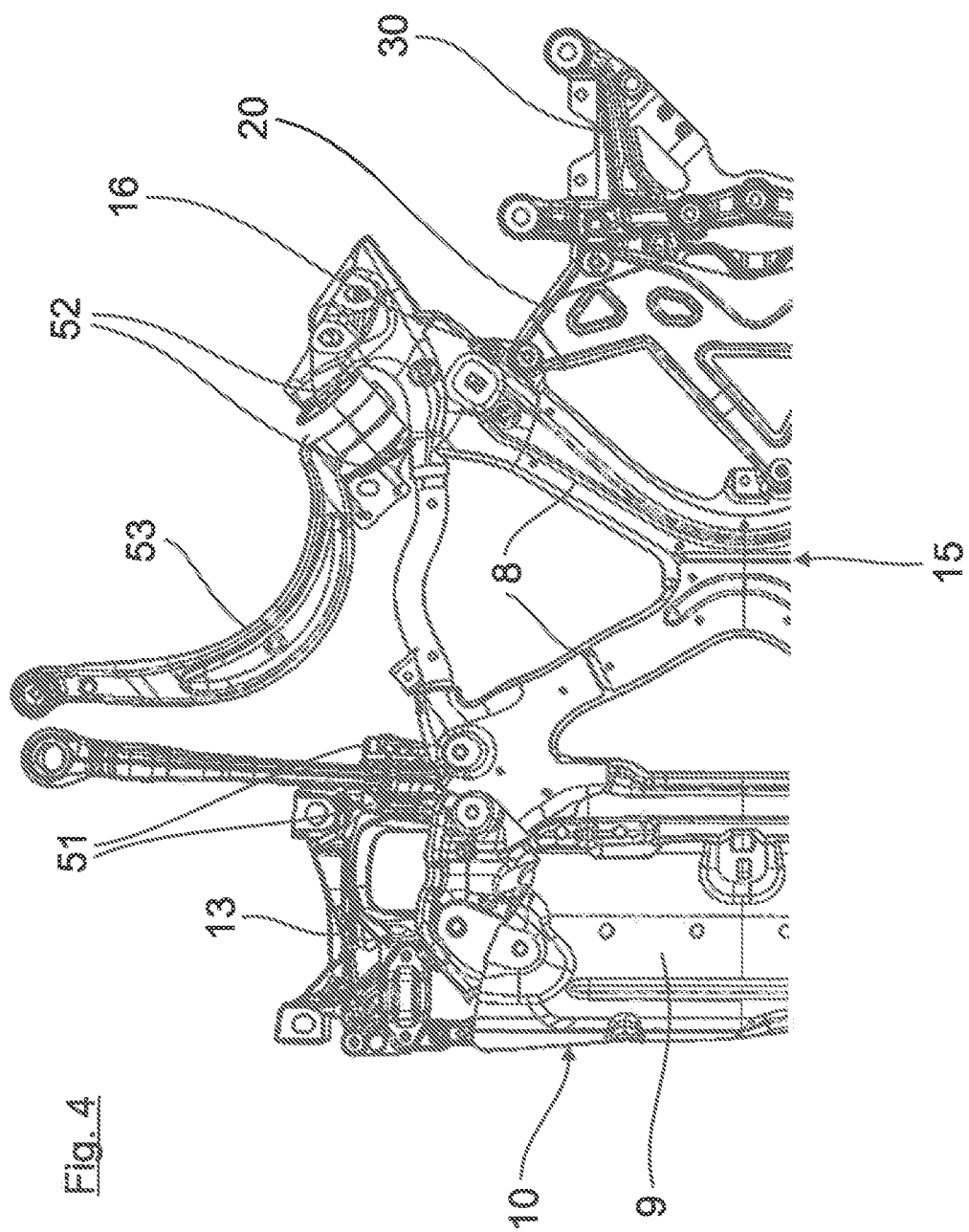
FIG. 4 a partial lateral view of the auxiliary frame with wheel guide elements (which is to say steering gear) connected to it, as well as with the intermediate coupling element.

The rear vehicle body longitudinal carriers-attachment points 12 of the auxiliary frame 10 are constructed directly adjacent to the rear steering brackets 52, on which is articulated in the assembled state a transverse link 53 (FIG. 4). Accordingly, the front steering console 51 are respectively formed directly in the node elements 13. For reinforcement, the auxiliary frame 10 is provided with a cross-shaped strut arrangement forming a thrust field, having converging strut sections 8 at a central node position, as well as on the opposite side are formed at the front node elements 13, as well as in the area of the rear attachment points 12 of the auxiliary longitudinal carrier 14.

Figure 3:
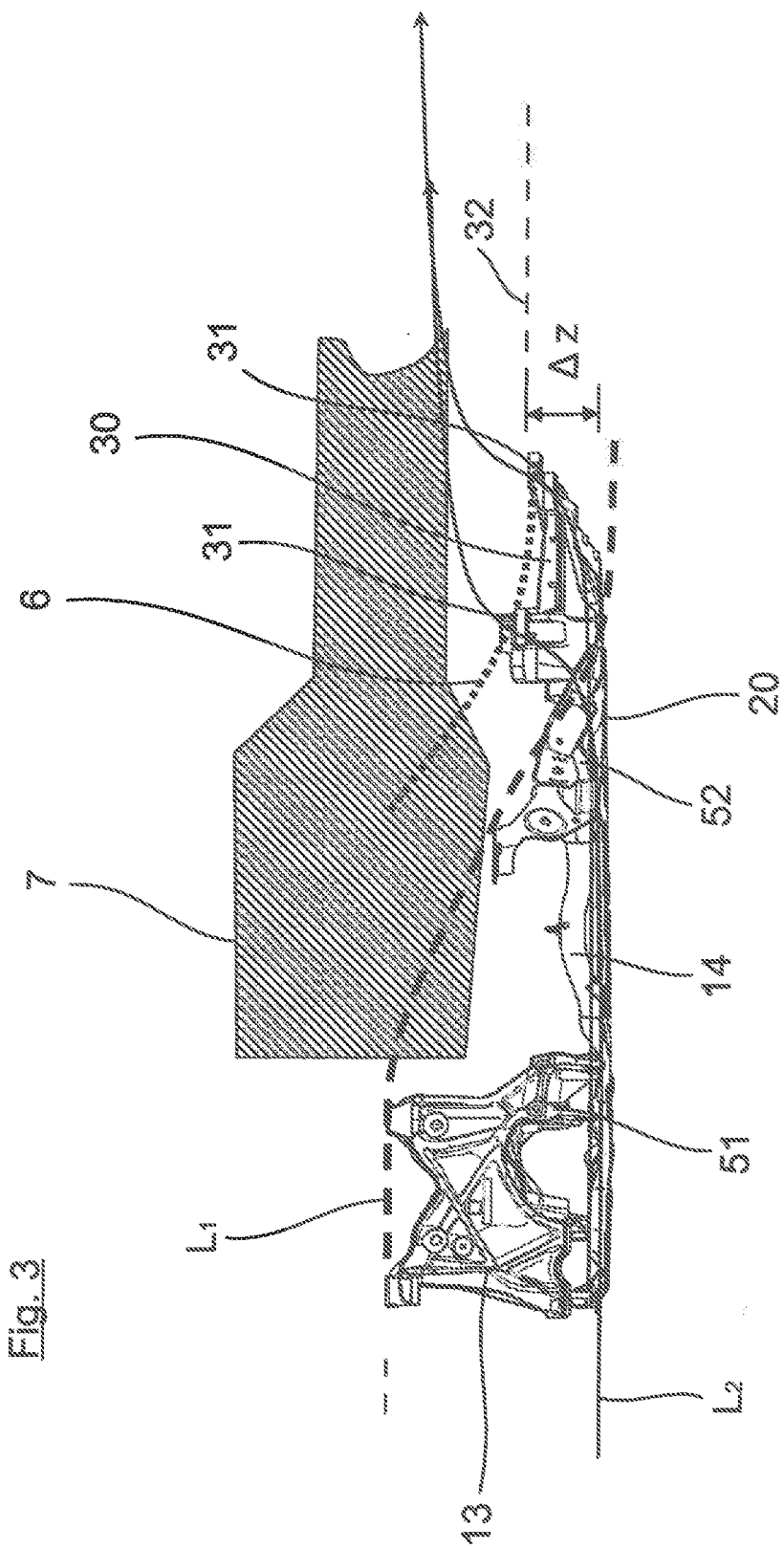
FIG. 3 the arrangement in a lateral view.

The auxiliary frame 10 forms together with a tunnel transverse carrier 30 a support base for supporting the drive assembly 7 indicated in FIG. 3. The drive assembly 7 can be provided in a manner that is per se known with an internal combustion engine to which is connected a transmission towards the rear in the longitudinal direction x of the vehicle. The transmission protrudes into a central tunnel (indicated by a dotted contour line 6 in FIG. 3), and the component part of a vehicle body floor group 4 (FIG. 1) is bridged over by the tunnel transverse carrier 30 in the transverse vehicle direction y. When three-point bearing is formed, the drive assembly 7 can be supported on two front lateral bearing points 5, which can be positioned in both node element 13 of the auxiliary frame 10, as well as supported on a central bearing location 5 at the tunnel transverse carrier 30.

As can be seen further from FIG. 1, the tunnel transverse carrier 30 is located at a distance from the auxiliary frame 10 which is determined by a longitudinal offset Δx. Between the auxiliary frame 10 and the tunnel transverse carrier 30 is arranged an intermediate coupling element 20 bridging over the longitudinal offset Δx, which connects the auxiliary frame 10 in a force-transmitting manner to the tunnel transverse carrier 30.

The intermediate coupling element 20 is in the illustrated embodiment a component that is separated from the auxiliary frame 10 and from the tunnel transverse carrier tunnel carrier which is provided with crow-like outer geometry. Three front connection points 16 are formed on it, by means of which the intermediate coupling element 20 is mounted at a rear transverse strut of the strut arrangement 15. In addition, the intermediate coupling element 20 is mounted at rear connection points 22 on the tunnel transverse carrier 30. As shown in the figures, the intermediate coupling elements has a flat construction and it is produced from sheet metal as a one-piece part which is positioned in the assembly approximately in a horizontal plane.

The tunnel transverse carrier 30 is connected with its vehicle body-side connection points 31 directly to the tunnel longitudinal carriers 32 (the contour of which is indicated by a dashed line in FIG. 3) to the vehicle body group 4. As shown in the figures, the tunnel longitudinal carriers 32 are positioned at a height offset Δz above the intermediate coupling element 20. The height offset Δz is bridged over by means of the tunnel transverse carrier 30. For this purpose, the tunnel transverse carrier 30 is provided with connection points 22 for mounting the intermediate coupling element 20 on it, which are positioned at a height offset Δz below the vehicle body connection points 31, so that a force-transmitting connection (which is to say a load path) can be provided in a simple manner between the vehicle body longitudinal carriers 1 and the tunnel longitudinal carriers 32.

As shown further in the figures, the strut sections 8 of the rear transverse struts of the strut arrangement 15 converge together towards the front in the longitudinal direction x at a central peak location 35. This creates a free space into which projects the intermediate coupling element 20. The intermediate coupling element 20 is in this case attached with a central connection point directly to the peak location 35, while the two lateral outer connection points are positioned in the vicinity of the rear steering bracket 52 (FIG. 4).

FIG. 3 indicates the resulting load paths which are created in the event of a frontal collision. Accordingly, both vehicle body longitudinal carriers 1, indicated only by the dotted lines, form a main load path $L_1$, by means of which the impact forces can be introduced into the floor group 4 of the vehicle body. Moreover, an additional secondary load path $L_2$ is provided, which is formed by the auxiliary frame 10, by the intermediate coupling element 20, as well as by the tunnel transverse carrier 30, and which is formed so that it is adjoining the tunnel carrier 32 in the direction x towards the rear of the vehicle.

The invention claimed is:

1. A two-track vehicle comprising:
    a vehicle body suspension with a front auxiliary frame which is connected to vehicle body longitudinal carriers and with a drive assembly bearing component with a tunnel transverse carrier, the tunnel transverse carrier is arranged at a longitudinal offset from the auxiliary frame in a vehicle longitudinal direction, and the tunnel transverse carrier bridges under a vehicle body-side central tunnel, wherein a drive assembly is supported by bearing points both on the auxiliary frame and on the tunnel transverse carrier, wherein an intermediate coupling element connects the auxiliary frame with the tunnel transverse carrier in a force-transmitting manner while bridging over the longitudinal offset wherein the tunnel transverse carrier is provided with vehicle body-side connection points for connecting to a vehicle floor element, in which is formed the central tunnel, and the tunnel transverse carrier is provided with separate connection points for connecting with the intermediate coupling element.

2. The two-track vehicle according to claim 1, wherein the intermediate coupling element is provided with a specialized reinforcing structure and the intermediate coupling element is a component that is separate from the auxiliary frame and from the tunnel transverse carrier, wherein the intermediate coupling element is provided with at least one front connection point for connecting at the auxiliary frame, and with at least one rear connection point for connecting at the tunnel transverse carrier.

3. The two-track vehicle according to claim 2, wherein the auxiliary frame includes auxiliary frame longitudinal carriers, which are connected to one another via transverse or diagonal struts, and the auxiliary frame is provided with front and rear attachment points for attachment to the vehicle body longitudinal carriers, and the intermediate coupling element is connected to the auxiliary frame with connection points toward an interior of the vehicle with respect to the auxiliary frame longitudinal carriers.

4. The two-track vehicle according to claim 3, wherein the auxiliary frame longitudinal carriers are connected in a transverse direction of the vehicle with a strut arrangement formed by the struts, and the intermediate coupling element is connected at one rear end of the strut arrangement.

5. The two-track vehicle according to claim 3, wherein the auxiliary frame longitudinal carriers are connected at the rear attachment points to the vehicle body longitudinal carriers with rear transverse struts, and the rear transverse struts converge together with strut sections in the vehicle longitudinal direction with a V-shape at a peak position, wherein the intermediate coupling element projects into a free space formed by the V-shape of the rear transverse struts.

6. The two-track vehicle according to claim 5, wherein the intermediate coupling element is provided with three front connection points, among which a central connection point is positioned at the peak position of the rear transverse struts and lateral connection points are positioned at the strut sections of the rear transverse struts converging into the V-shape, in the vicinity of a steering bracket formed at the auxiliary frame.

7. The two-track vehicle according to claim 1, wherein at the tunnel transverse carrier are arranged connection points for the construction of the intermediate coupling element at a height offset below the vehicle body-side connection points, and in an assembled position, construction connection points and front connection points of the intermediate coupling element are arranged at the same height in a vehicle direction.

8. The two-track vehicle according to claim 1, wherein the floor element is provided with tunnel longitudinal carriers, which reinforce the central tunnel on both sides, and the tunnel transverse carrier is connected in a force-transmitting manner to the tunnel longitudinal carriers.

9. The two-track vehicle according to claim 8, wherein the intermediate coupling element lies in an assembled position completely in a horizontal plane, and the intermediate coupling element is arranged at a height offset below the tunnel longitudinal carriers, and the height offset between the intermediate coupling element and the tunnel longitudinal carriers can be bridged over by the tunnel transverse carrier.

10. The two-track vehicle according to claim 1, wherein the intermediate coupling element is provided with a flat construction and is formed from sheet metal as a one-piece part.

* * * * *